US008595852B2

(12) United States Patent
Chang et al.

(10) Patent No.: US 8,595,852 B2
(45) Date of Patent: Nov. 26, 2013

(54) METHOD FOR PROVIDING SHARED CONTENTS IN A PORTABLE TERMINAL TO AN EXTERNAL APPARATUS

(75) Inventors: Woo-Yong Chang, Yongin-si (KR); Seung-dong Yu, Osan-si (KR); Se-jun Park, Yongin-si (KR); Min-jeong Moon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/943,691

(22) Filed: Nov. 10, 2010

(65) Prior Publication Data

US 2011/0119406 A1 May 19, 2011

(30) Foreign Application Priority Data

Nov. 13, 2009 (KR) ........................ 10-2009-0109494

(51) Int. Cl.
G06F 7/04 (2006.01)
G06F 3/00 (2006.01)
G06F 17/30 (2006.01)

(52) U.S. Cl.
USPC ..................................... 726/27; 710/5; 726/2

(58) Field of Classification Search
None
See application file for complete search history.

(56) References Cited

U.S. PATENT DOCUMENTS

| 7,684,673 B2 * | 3/2010 | Monroe | 386/297 |
| 8,145,571 B2 * | 3/2012 | Jothipragasam et al. | 705/59 |
| 8,305,422 B2 * | 11/2012 | Toya et al. | 348/14.08 |
| 2010/0161818 A1 * | 6/2010 | Capuozzo et al. | 709/229 |

FOREIGN PATENT DOCUMENTS

| KR | 1020050114899 | 12/2005 |
| KR | 1020060065914 | 6/2006 |
| KR | 1020070013739 | 1/2007 |
| KR | 1020080097857 | 11/2008 |

OTHER PUBLICATIONS

Wilson Rothman; Win 7 Tip: 'Play To' Media Control Might Take Over Your Whole House; Jan. 28, 2009; Gizmodo.com; p. 1-2.*

* cited by examiner

Primary Examiner — Idriss N Alrobaye
Assistant Examiner — Richard B Franklin
(74) Attorney, Agent, or Firm — The Farrell Law Firm, P.C.

(57) ABSTRACT

A content providing method is provided involving an electronic apparatus and an external apparatus communicably connected with each other. A play command of the external apparatus for a particular content is received. at the electronic apparatus When the particular content is set to a content transferable to the external apparatus, the electronic apparatus sends the particular content to the external apparatus in response to the play command. Thus, a user can check only specified photos in the external apparatus.

19 Claims, 13 Drawing Sheets

METHOD FOR PROVIDING SHARED CONTENTS IN A PORTABLE TERMINAL TO AN EXTERNAL APPARATUS

PRIORITY

This application claims priority under 35 U.S.C. §119(a) to Korean Patent Application No. 10-2009-0109494 filed on Nov. 13, 2009 in the Korean Intellectual Property Office, the entire disclosure of which is incorporated herein by reference.

BACKGROUND OF THE INVENTION

1. Field of the Invention

The present invention relates generally to a content providing method, and more particularly to a method for providing contents to an external apparatus.

2. Description of the Related Art

Recent advances in portable phone technology allow a portable phone to provide not only a mobile phone function, but also complicated multimedia functions, including a camera and an MP3 player. Naturally, users can also utilize a mobile phone service and a function for taking and storing pictures.

Due to the development of communication technologies, the portable phone is capable of sending its stored pictures to an external apparatus. In general, since the size of the portable phone is small, a size of a display screen is also small. To see the picture stored to the portable phone in a large screen, the user needs to duplicate the picture to a display apparatus (e.g., TV, computer, etc.) having a large-scale screen. Recently developed TVs are communicably connectable with the portable phone to provide the function for checking the pictures stored to the portable phone in real time.

However, the user may not want to reveal all of his/her pictures in the portable phone.

SUMMARY OF THE INVENTION

The present invention has been made to address at least the above problems and/or disadvantages and to provide at least the advantages described below. Accordingly, an aspect of the present disclosure provides a content providing method for receiving a play command of a particular content from an external apparatus and for transferring the particular content to the external apparatus in response to the play command when the particular content is defined as a content transferable to the external apparatus.

According to one aspect of the present invention, a content providing method of an electronic apparatus communicably connected with an external apparatus is provided. A play command of the external apparatus is received for a particular content. When the particular content is set to a content transferable to the external apparatus, the particular content is sent to the external apparatus in response to the play command.

The content providing method may further include setting at least one content selected by a user from a plurality of stored contents, to the content transferable to the external apparatus.

The content providing method may further include sending a no transfer message in response to the play command when the particular content is set to a content untransferable to the external apparatus.

The content providing method may further include receiving a content list transfer command from the external apparatus. In response to the content list transfer request, a list is sent to the external apparatus that includes only contents transferable to the external apparatus among a plurality of stored contents.

According to another aspect of the invention, a content providing method of a content providing system, which includes an electronic apparatus and an external apparatus communicably connected with each other, is provided. The external apparatus receives a play command for a particular content. The external apparatus sends the play command for the particular content to the electronic apparatus. When the particular content is set to a content transferable to the external apparatus, The electronic apparatus sends the particular content to the external apparatus in response to the play command. The external apparatus plays the received particular content.

The content providing method may further include setting, at the electronic apparatus, at least one content selected by a user from a plurality of stored contents, to the content transferable to the external apparatus.

The content providing method may further include sending a no transfer message from the electronic apparatus to the external apparatus in response to the play command, when the particular content is set to a content untransferable to the external apparatus.

The content providing method may further include receiving, at the external apparatus, a content list display request. The external apparatus sends a content list transfer request to the electronic apparatus. In response to the content list transfer request, the electronic apparatus sends a list including the contents transferable to the external apparatus among the plurality of the stored contents, to the external apparatus.

The content providing method may further include receiving, at the electronic apparatus, an external play command for playing the particular content in the external apparatus. The transferring operation of the particular content to the external apparatus may transfer the particular content from the electronic apparatus to the external apparatus in response to the input play command when the particular content is set to the content transferable to the external apparatus.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 1:
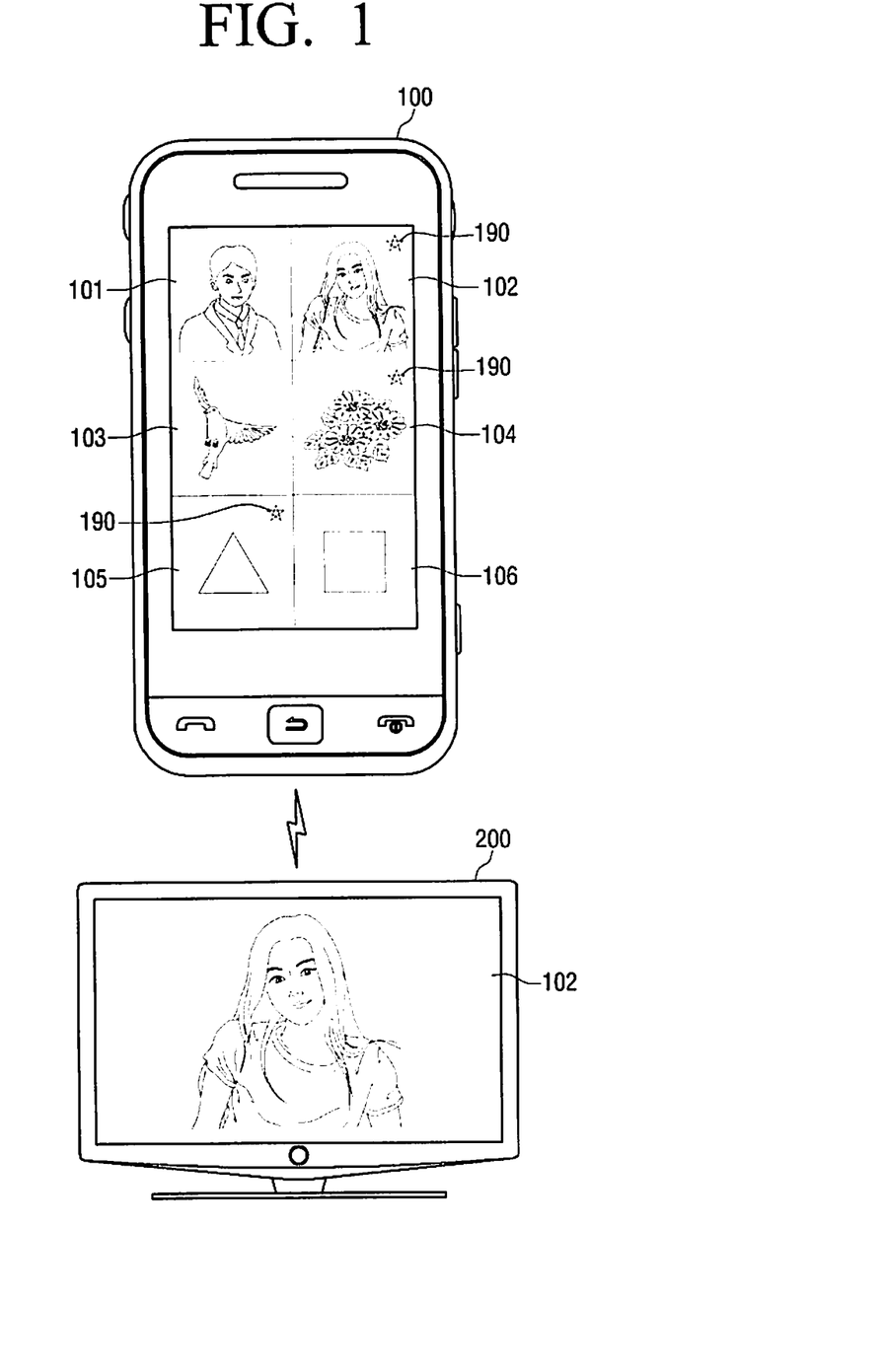
FIG. 1 is a diagram illustrating a content providing system including a portable phone and a TV, according to an embodiment of the present invention.

FIG. 1 is a diagram illustrating a content providing system including a portable phone 100 and a TV 200, according to an embodiment of the present invention.

As shown in FIG. 1, the portable phone 100 displays a photo list on its screen. The photo list includes a first photo 101, a second photo 102, a third photo 103, a fourth photo 104, a fifth photo 105, and a sixth photo 106.

An open tag 190 is marked on the second photo 102, the fourth photo 104, and the fifth photo 105. The open tag 190 indicates that a particular tagged content is opened to an external apparatus. Specifically, the open tag 190 indicates that the particular tagged content is set as a content transferable to the external apparatus. When the open tag 190 is set, the tagged content is revealed to the external apparatus and transferable to the external apparatus.

In FIG. 1, the portable phone 100 sets the second photo 102, the fourth photo 104, and the fifth photo 105 with the open tag 190, for display on the TV 200.

A screen of the TV 200 displays the second photo 102 in FIG. 1. The TV 200 receives the tagged photos from the portable phone 100 and displays the received photos on the screen.

The portable phone 100 transfers only the photos with the open tag 190 to the TV 200, and the TV 200 displays the received photos on the screen. A user can mark the open tag 190 on his/her intended photo and view only the intended photo on the TV 200.

Figure 2:
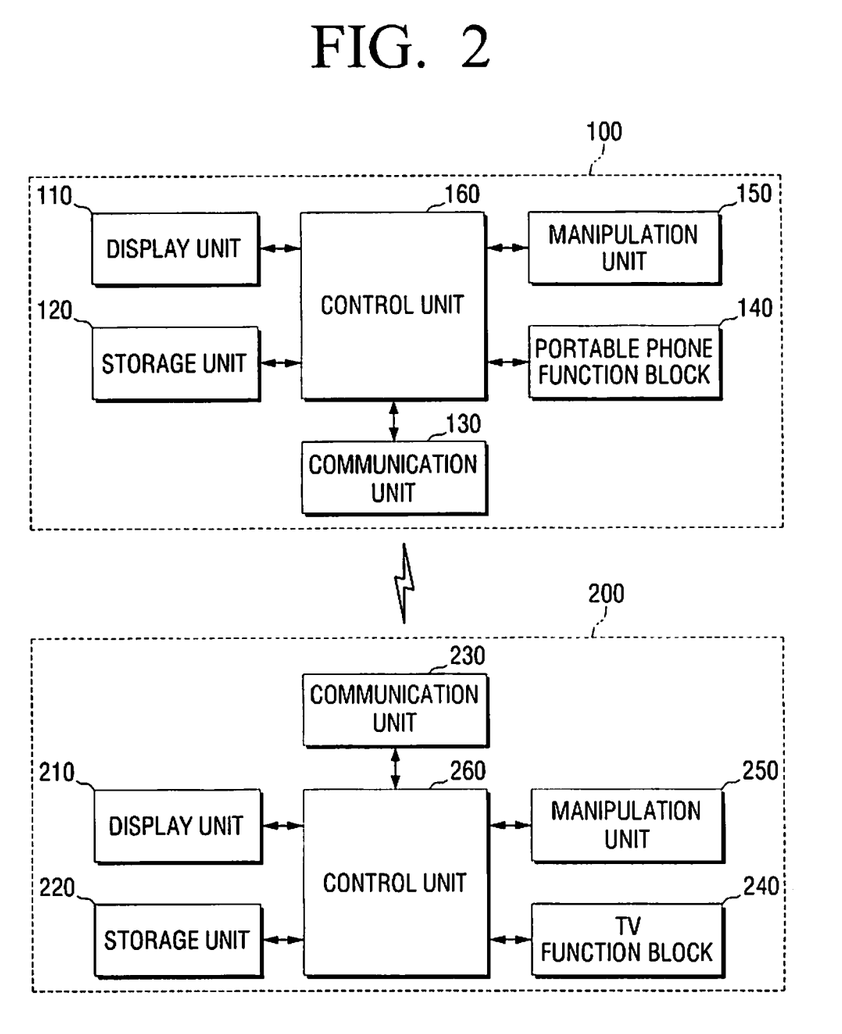
FIG. 2 is a detailed block diagram illustrating the portable phone and the TV, according to an embodiment of the present invention.

FIG. 2 is a detailed block diagram illustrating the portable phone 100 and the TV 200, according to an embodiment of the present invention.

The portable phone 100 of FIG. 2 includes a display unit 110, a storage unit 120, a communication unit 130, a portable phone function block 140, a manipulation unit 150, and a control unit 160.

The display unit 110 displays an image for providing functions of the portable phone 100. The display unit 110 displays Graphic User Interfaces (GUIs) for the user's manipulation on the screen. The display unit 110 may display a list of the photo contents stored to the portable phone 100 on the screen. The display unit 110 can mark the open tag 190 on the photo of which the open tag 190 is set, in the photo content list.

The storage unit 120 stores programs for the various functions of the portable phone 100. The storage unit 120 stores various contents. The storage unit 120 may save the contents with the open tag being set. The storage unit 120 can be implemented using a hard disk, a non-volatile memory, and so forth.

The communication unit 130 can provide a mobile phone service over a mobile communication network. The mobile communication network can use a Group Special Mobile (GSM) communication network or a Wideband Code Division Multiple Access (WCDMA) communication network.

The communication unit 130 is communicably connected with the TV 200 over a wired or wireless communication network. The communication unit 130 can adopt a wired Local Area Network (LAN) or a Universal Serial Bus (USB) for the wired communication, and a wireless LAN, Bluetooth, or Zigbee for the wireless communication.

The communication unit 130 receives a play command for a particular content from the TV 200. The play command instructs to play the particular content in the TV 200. In response to the play command, the communication unit 130 sends the particular content with the open tag 190, to the TV 200.

The portable phone function block 140 performs the functions of the portable phone. For example, the portable phone function block 140 carries out a mobile phone function, a texting service function, a bell sound function, etc.

The manipulation unit 150 receives and sends a user's manipulation to the control unit 160. Specifically, the manipulation unit 150 receives an open tag set command, an external play command, and an option set command from the user.

The open tag set command instructs to set the open tag to at least one of the stored contents. The external play command instructs to play the open-tagged contents in the external apparatus. The option set command instructs to set one of a full open option and a selective open option. The full open option transfers every content to the external apparatus regardless of the open tagging. The selective open option transfers only the open-tagged content to the external apparatus.

The manipulation unit 150 can receive various commands from the user. The manipulation unit 150 can be a button or a touch screen mounted on the portable phone 100.

The control unit 160 controls the operations of the portable phone 100. More specifically, the control unit 160 controls the communication unit 130 to receive the play command of the particular content from the TV 200. When the particular content is set as the content transferable to the external apparatus (i.e., marked with the open tag), the control unit 160 controls to send the particular content to the TV 200 in response to the play command.

The control unit 160 sets at least one content selected by the user from the plurality of the stored contents, as the content transferable to the external apparatus (i.e., the open-tagged content). The control unit 160 tags the content transferable to the external apparatus.

For example, the control unit 160 can set the open tag by tagging on a header of content data transferable to the external apparatus. The information relating to the open tag is managed per content. Even when the content is duplicated to another portable phone, the open-tagged content is maintained.

The control unit 160 may set the open tag by adding the content transferable to the external apparatus to the open tag list. When the open-tagged contents are managed using the open tag list, the open-tagged content list is managed per portable phone.

As stated above, the control unit 160 can set and manage the open tag in the two manners.

When a particular content is set as the content untransferable to the external apparatus (i.e., not open-tagged), the control unit 160 controls the communication unit 130 to send a no transfer message to the TV 200 in response to the play command.

The control unit 160 may receive a content list transfer request from the TV 200. In response to the content list transfer request, the control unit 160 controls the communication unit 130 to send a list of the contents transferable to the external apparatus among the plurality of the stored contents (i.e., the open-tagged contents to the TV 200). Hence, the user can see the open-tagged contents of the portable phone 100 through the TV 200.

When the selective open option is selected and a particular contents is set as the content transferable to the external apparatus (i.e., a particular content is open-tagged), the control unit 160 controls to send the particular content to the TV 200 in response to the play command. By contrast, when the full open option is selected, the control unit 160 sends the particular content to the TV 200 in response to the play command regardless of whether the particular content is set as the content transferable to the external apparatus (i.e., whether the open tag is set).

When an external play command for playing a particular content at the external apparatus is input and the particular content is set to the content transferable to the external apparatus (i.e., the particular content is open-tagged), the control unit 160 may send the particular content to the TV 200 in response to the input play command. For example, when the user inputs the external play command of a particular photo, the control unit 160 checks whether the corresponding photo is open-tagged. When the photo is open-tagged, the control unit 160 transfers the corresponding photo to the TV 200 in response to the input play command.

The control unit 160 may receive a batch transfer command from the TV 200. Upon receiving the batch transfer command, the control unit 160 transfers only the open-tagged contents to the TV 200. Thus, the user can receive all of the open-tagged contents using the TV 200.

The control unit 160 may determine whether to transfer the content using not only the open tagging but also user information of the external apparatus. The user information indicates information relating to the user of the external apparatus. For example, the user information can include a user ID.

More specifically, the control unit 160 may send the corresponding content to the external apparatus only when its user information matches the user information of the external apparatus and the open tag is set. When its user information does not match the user information of the external apparatus (i.e., when the user of the external apparatus is different from the user of the portable phone 100), the control unit 160 may not send the content that is open-tagged.

As such, according to whether the user information of the external apparatus matches, the control unit 160 may determine whether to transfer the open-tagged content.

For the content without the open tag, the control unit 160 may determine whether to send the content using metadata of the content. For example, when receiving the play command for the content without the open tag from the external apparatus, the control unit 160 can compare user IDs of the external apparatus and the metadata and transfer the corresponding content only when the IDs match. As such, even for the content without the open tag, the control unit 160 may determine whether to transfer the corresponding content to the external apparatus in terms of the metadata.

As shown in FIG. 2, the TV 200 includes a display unit 210, a storage unit 220, a communication unit 230, a TV function block 240, a manipulation unit 250, and a control unit 260.

The display unit 210 displays broadcast program images and input images of the TV 200. The display unit 210 displays GUIs for the user's manipulation on the screen.

The display unit 210 may display or play the list of the contents or the content received from the portable phone 100 on the screen.

The storage unit 220 stores programs for various functions of the TV 200. The storage unit 120 stores various contents received from the portable phone 100. The storage unit 220 can be implemented using a hard disk, a non-volatile memory, and so forth.

The communication unit 230 is communicably connectable with the portable phone 200 over the wired or wireless communication network. The communication unit 230 can use the wired LAN or the USB as the wired communication, and the wireless LAN, Bluetooth, or Zigbee as the wireless communication.

When the play command for a particular content stored to the portable phone 100 is input, the communication unit 230 sends the play command of the particular content to the portable phone 100. In reply to the play command, the communication unit 230 receives the open-tagged particular content from the portable phone 100.

The TV function block 240 performs the functions of the TV 200. For example, the TV function block 240 carries out channel tuning, image processing, and so on.

The manipulation unit 250 receives and sends a user's manipulation to the control unit 260. Specifically, the manipulation unit 250 receives an external content play command and an external content list display command from the user.

The external content play command instructs to play the content stored to the external apparatus. For example, the external content play command can instruct to display the photo content stored to the portable phone 100 on the screen.

The external content list display command instructs to display the list of the contents stored to the external apparatus. The content list may include only the open-tagged contents. For example, the external content list display command may instruct to display the list of the open-tagged photo contents among the photo contents stored to the portable phone 100, on the screen.

As described above, the manipulation unit 250 can receive various commands from the user. The manipulation unit 250 can be a button or a remote controller disposed on the TV 200.

The control unit 260 controls operations of the TV 200. Specifically, when the external content play command for a particular content is input, the control unit 260 sends the content play command to the portable phone 100. When the particular content is received from the portable phone 100, the control unit 260 displays or plays the received particular content on the screen. The particular content received at the control unit 260 from the portable phone 100 corresponds to the open-tagged content.

When the external content list display command is input, the control unit 260 sends the content list transfer request to the portable phone 100. Next, the control unit 260 controls to display the content list received from the portable phone 100 on the screen. The content list received from the portable phone 100 corresponds to the content list of the open-tagged contents.

The control unit 260 may receive the batch transfer command from the user. When the batch transfer command is input, the control unit 260 forwards the batch transfer command to the portable phone 100. In reply to the batch transfer command, the control unit 260 receives only the open-tagged contents from the portable phone 100. Thus, the user can receive the open-tagged contents all together using the TV 200.

As constructed above, the portable phone 100 transfers only the open-tagged contents to the TV 200. Accordingly, the portable phone 100 is configured to check only the contents selected by the user through the TV 200.

Figure 3:
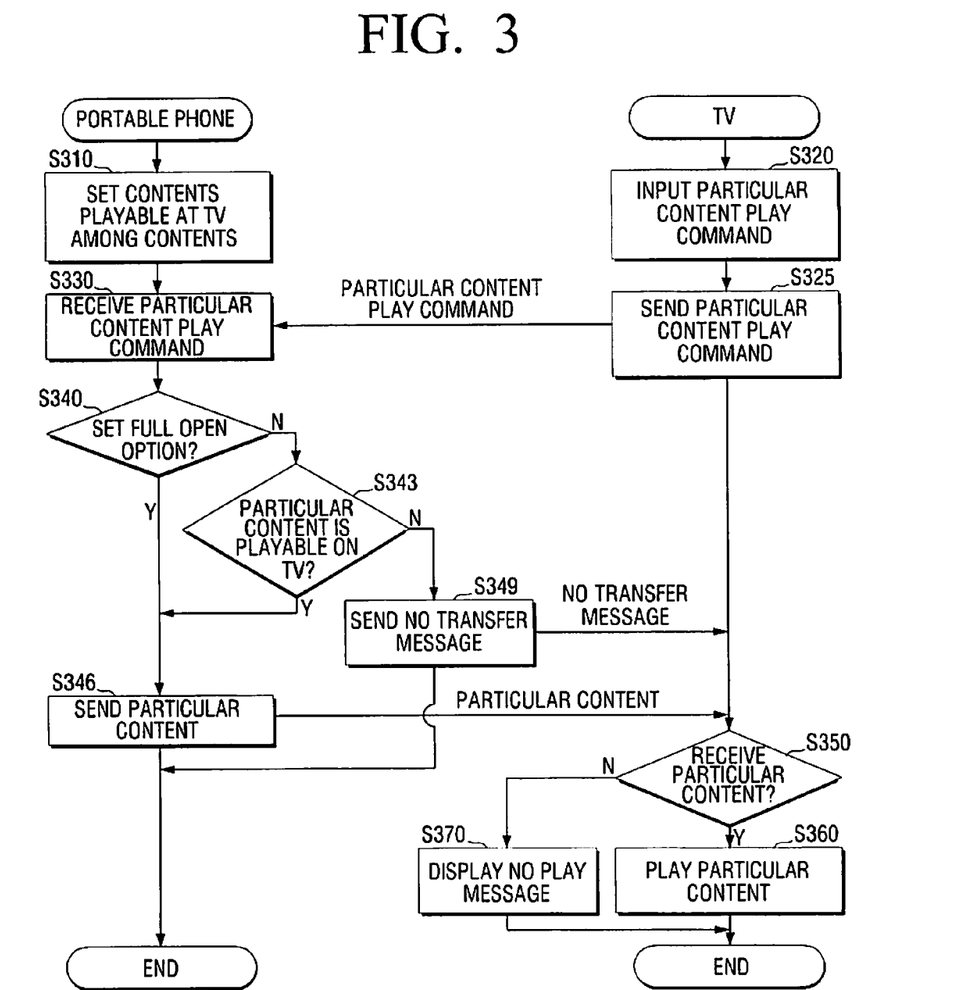
FIG. 3 is a flowchart illustrating a content providing method of the portable phone and the TV, according to an embodiment of the present invention.

FIG. 3 is a flowchart illustrating the content providing method of the portable phone and the TV, according to an embodiment of the present invention.

The portable phone 100 sets at least one content selected by the user among the plurality of the stored contents, as the content transferable to the TV 200 (i.e., as the open-tagged content), in step S310. Specifically, the portable phone 100 tags the content transferable to the TV 200. For example, the portable phone 100 may set the open tag by marking the tag on a header of the content data of the content transferable to the TV 200.

The TV 200 receives the external content play command of a particular content from the user in step S320. The TV 200 sends the content play command of the particular content to the portable phone 100 in step S325.

The portable phone 100 receives the play command for the particular content in step S330. The portable phone 100 determines whether the full open option is set in step S340. When the full open option is set, the portable phone 100 transfers the particular content to the TV 200 in reply to the play command regardless of whether the particular content is set to the content transferable to the external apparatus (i.e., regardless of whether the open tag is set), in step S346.

By contrast, when the full open option is not set (i.e., when the selective open option is selected), the portable phone 100 determines whether the particular content is set to the content transferable to the external apparatus (i.e., whether the particular content is open-tagged), in step S343. When the particular content is set to the content transferable to the external apparatus (i.e., when the particular content is open-tagged), in response to the play command, the portable phone 100 transfers the particular content to the TV 200 in step S346.

When the particular content is set to the content untransferable to the external apparatus (i.e., when the particular content is not open-tagged), the portable phone 100 sends the no transfer message to the TV 200 in response to the play command in step S349.

In step S350, it is determined whether particular content is received. When receiving the particular content, the TV 200 plays the particular content in step S360. When the particular content is the photo, the TV 200 displays the photo on the screen.

When the particular content is not received and the no transfer message is received, the TV 200 displays the no transfer message, indicating that the particular content is untransferable to the TV 200, on the screen in step S370.

While the portable phone 100 transfers the contents to the TV 200 in this embodiment of the present invention, the portable phone 100 may send the content list to the TV 200. Upon receiving the external content list display command, the TV 200 sends the content list play command to the portable phone 100. Next, the portable phone 100 receives the content list play command from the TV 200. In response to the content list transfer command, the portable phone 100 sends the list of the contents transferable to the external apparatus (i.e., the open-tagged contents among the stored contents), to the TV 200.

The TV 200 displays the content list received from the portable phone 100 on the screen. The content list received from the portable phone 100 corresponds to the content list of the open-tagged contents.

Thus, the user can see the open-tagged contents of the portable phone 100 through the TV 200.

While the external play command of the particular content is input to the TV 200 in this embodiment, the external play command of the particular content can be input to the portable phone 100, which is now described in detail with reference to FIG. 4.

Figure 4:
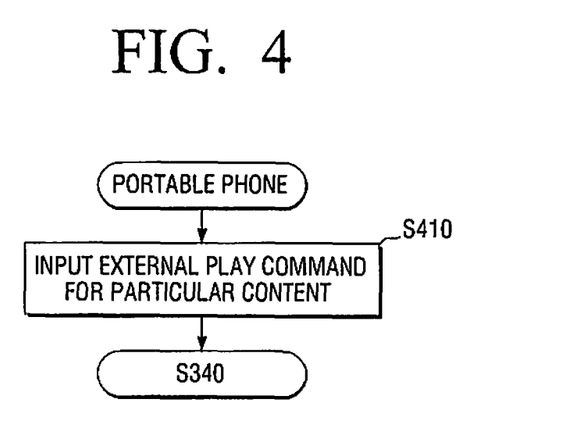
FIG. 4 is a flowchart illustrating the input of a content play command to the portable phone, according to an embodiment of the present invention.

FIG. 4 is a flowchart illustrating the input of the content play command to the portable phone 100, according to an embodiment of the present invention.

The portable phone 100 receives the external play command for playing a particular content on the TV 200 in step S410. Next, the portable phone 100 performs the sequence of steps beginning at step S340 of FIG. 3. When the particular content is set as the content transferable to the external apparatus (i.e., when the particular content is open-tagged), the portable phone 100 transfers the particular content to the TV 200 in reply to the input play command. For example, when the user inputs the external play command for a particular photo, the portable phone 100 checks whether the corresponding photo is open-tagged. When the photo is open-tagged, the portable phone 100 sends the corresponding photo to the TV 200 in response to the input play command.

Thus, the portable phone 100 transfers the only the open-tagged contents to the TV 200. The portable phone 100 sets to view only the contents selected by the user through the TV 200.

FIGS. 5A through 5F are diagrams illustrating the content provision of the portable phone 100 and the TV 200, according to an embodiment of the present invention.

Figure 5A:
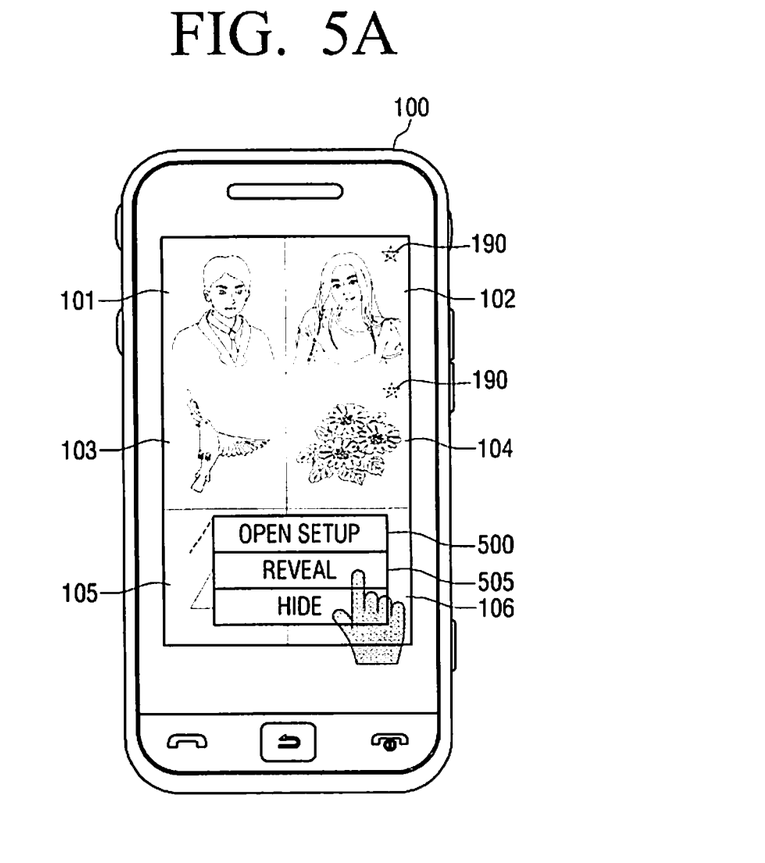
FIGS. 5A through 5F are diagrams illustrating content provision of the portable phone and the TV, according to an embodiment of the present invention.

FIG. 5A depicts the open tag marked on the user's intended photo in the photo list of the portable phone 100. Herein, the open tag 190 indicates whether the tagged particular content is opened to the external apparatus. Specifically, the open tag 190 indicates whether the tagged particular content is set to the content transferable to the external apparatus. In more detail, when the open tag 190 is set, the tagged content is opened and transferable to the external apparatus.

The portable phone 100 displays the photo list in the screen as shown in FIG. 5A. The photo list includes a first photo 101, a second photo 102, a third photo 103, a fourth photo 104, a fifth photo 105, and a sixth photo 106. The second photo 102 and the fourth photo 104 are marked with the open tag 190.

In FIG. 5A, the user sets whether to open the fifth photo 105. When the user selects a reveal item 505 in the open setup menu 500 of the fifth photo 105 as shown in FIG. 5A, the portable phone 100 marks the open tag on the fifth photo 105. Specifically, the portable phone 100 sets the fifth photo 105 to the content transferable to the external apparatus.

Figure 5B:
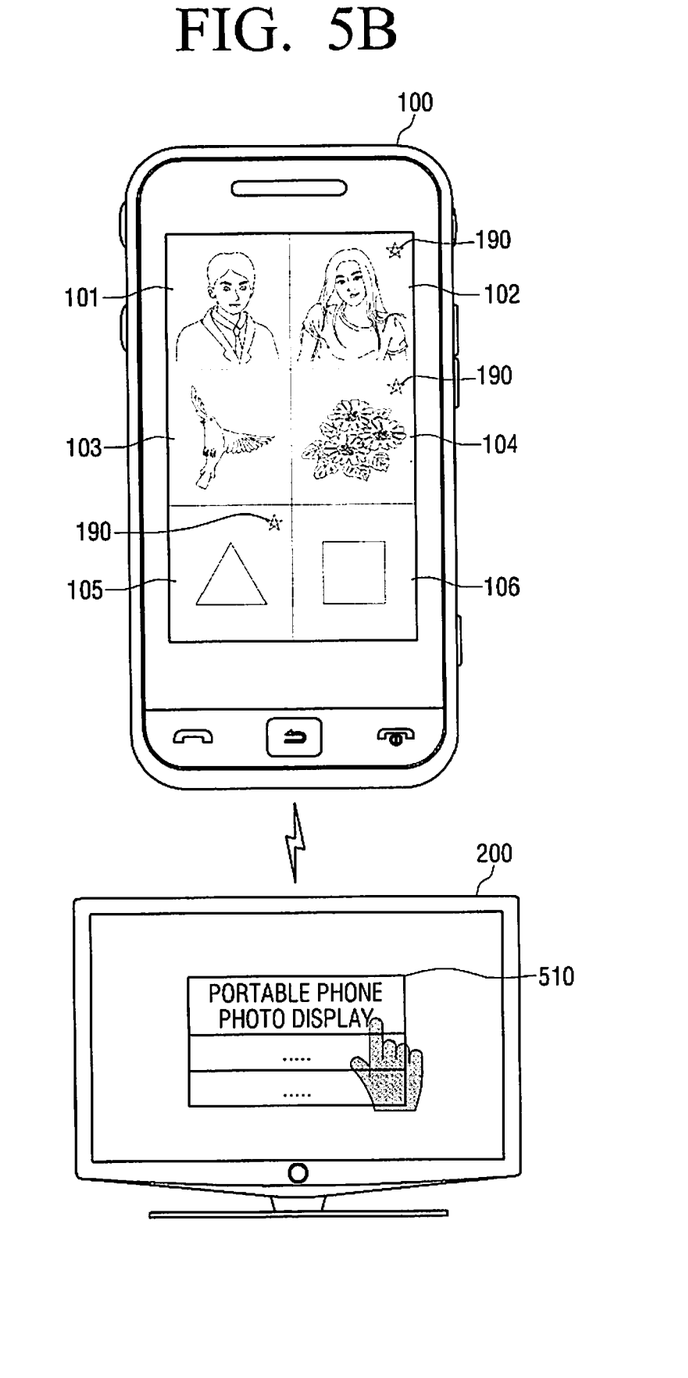

When the user selects the reveal item 505 of the fifth photo 105 as shown in FIG. 5A, the open tag 190 is marked on the fifth photo 105 in the portable phone 100 as shown in FIG. 5B.

FIG. 5B depicts the particular content play command input by the user through the TV 100. When the user selects a 'portable phone photo display' item 510 as shown in FIG. 5B, the TV 200 receives the particular content play command for displaying the second photo 102 of the portable phone 100.

Figure 5C:
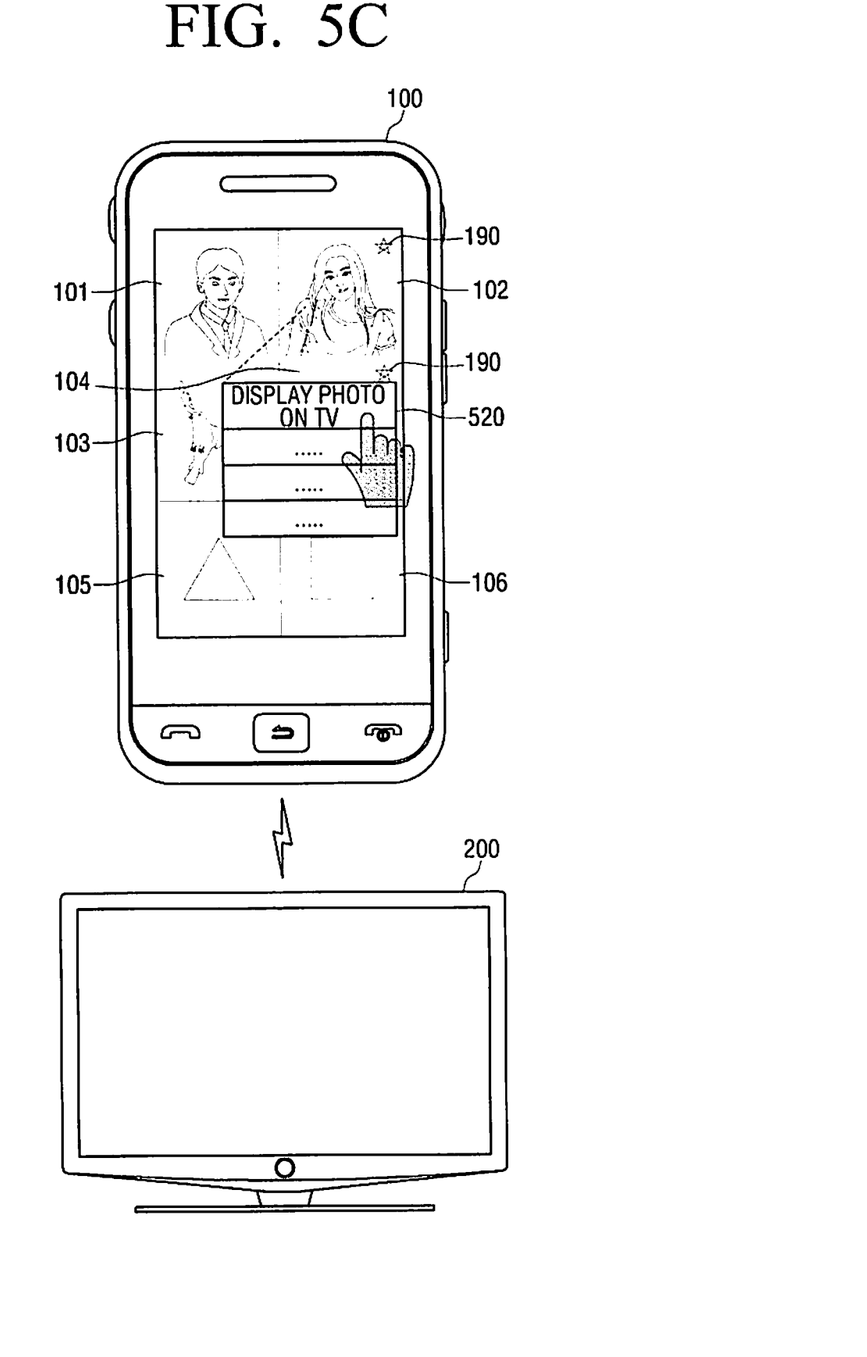

FIG. 5C depicts the external play command of the particular content input by the user through the portable phone 200. When the user selects a 'display photo on TV' item 520 as shown in FIG. 5C, the portable phone 100 receives the external play command for displaying the second photo 102 on the TV 200.

Figure 5D:
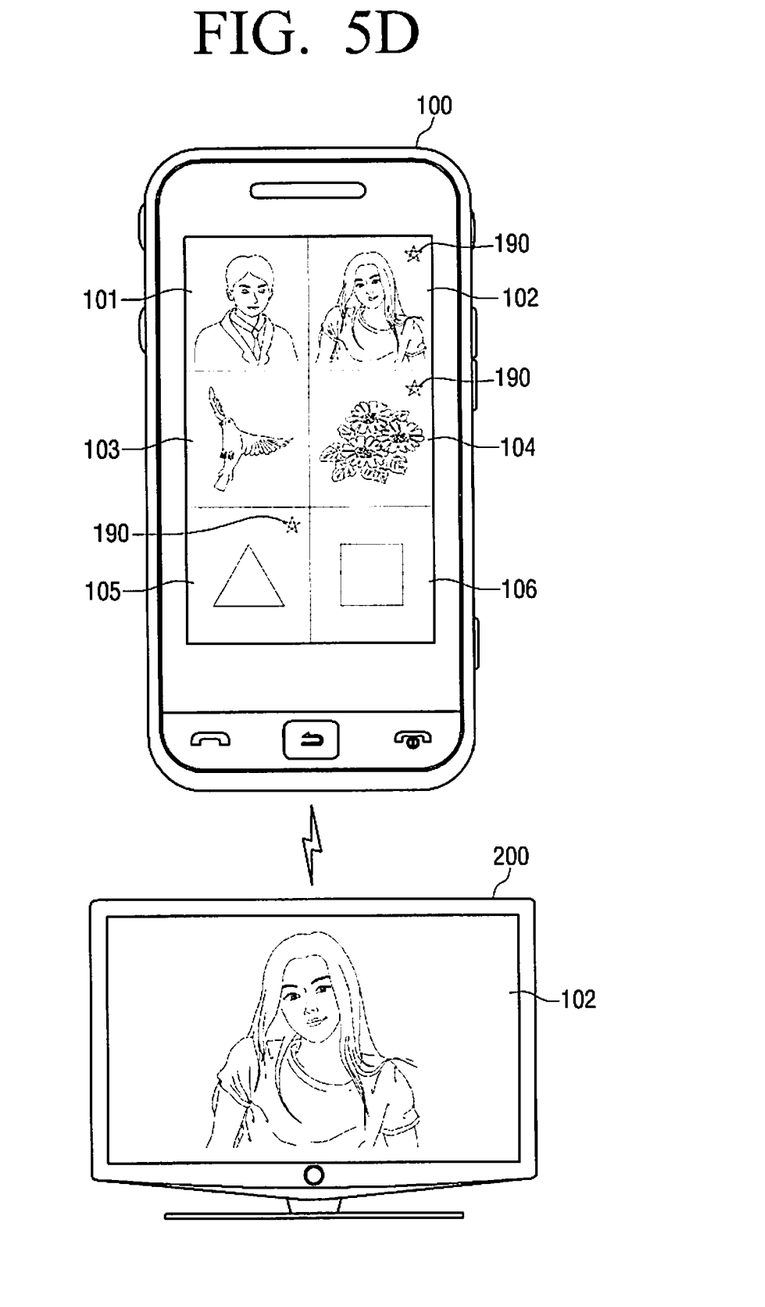

When the TV 200 receives the particular content play command for the second photo 102 from the user as shown in FIG. 5B or when the portable phone 100 receives the external play command for the second photo 102 from the user as shown in FIG. 5C, the TV 200 displays the second photo 102 on the screen as shown in FIG. 5D.

Figure 5E:
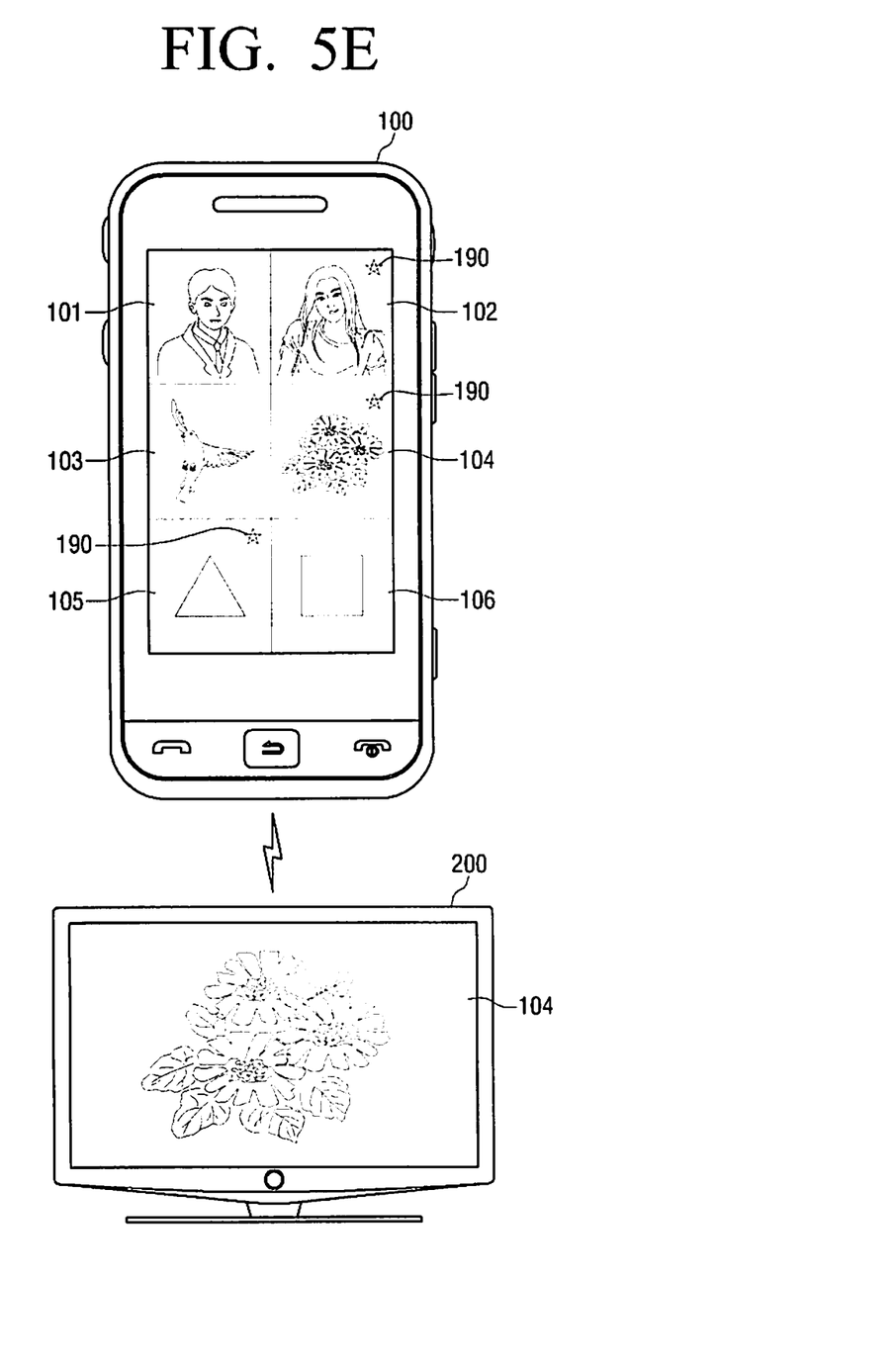

FIG. 5E depicts a result screen when a next photo display command is input in FIG. 5D. When the second photo 102 is displayed on the TV 200 as shown in FIG. 5D and the user inputs a command for displaying a next photo, the portable phone 100 transfers the fourth photo 104 to the TV 200. As a result, the TV 200 displays the fourth photo 104 following the second photo 102 as shown in FIG. 5E. Since the third photo 103 of the portable phone 100 is not open-tagged and the TV 200 cannot display the third photo 103, the fourth photo 104 is displayed as the next photo of the second photo 102.

Figure 5F:
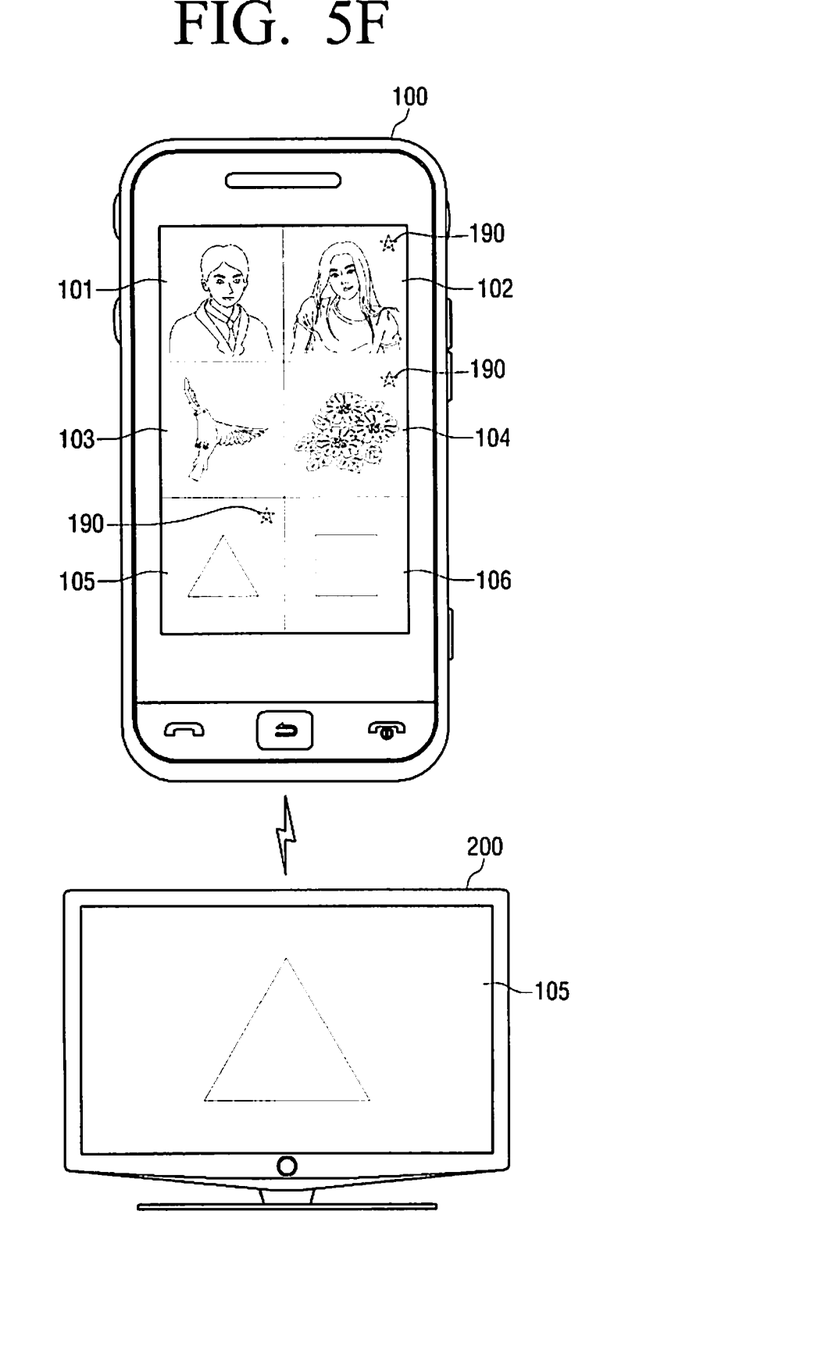

FIG. 5F depicts a result screen when a next photo display command is input in FIG. 5E. When the fourth photo 102 is displayed on the TV 200 as shown in FIG. 5E and the user inputs a command for displaying a next photo, the portable phone 100 transfers the fifth photo 105 to the TV 200. Hence, the TV 200 displays the fifth photo 105 as the next photo of the fourth photo 104 as shown in FIG. 5F.

When a next photo display command is input in FIG. 5F, the TV 200 displays the second photo 102 again as the next photo as shown in FIG. 5D.

As such, the portable phone 100 can set to display only the photos open-tagged by the user on the TV 200. Thus, the user can set to display his/her intended photos of the photos stored to the portable phone 100 on the TV 200.

Figure 6:
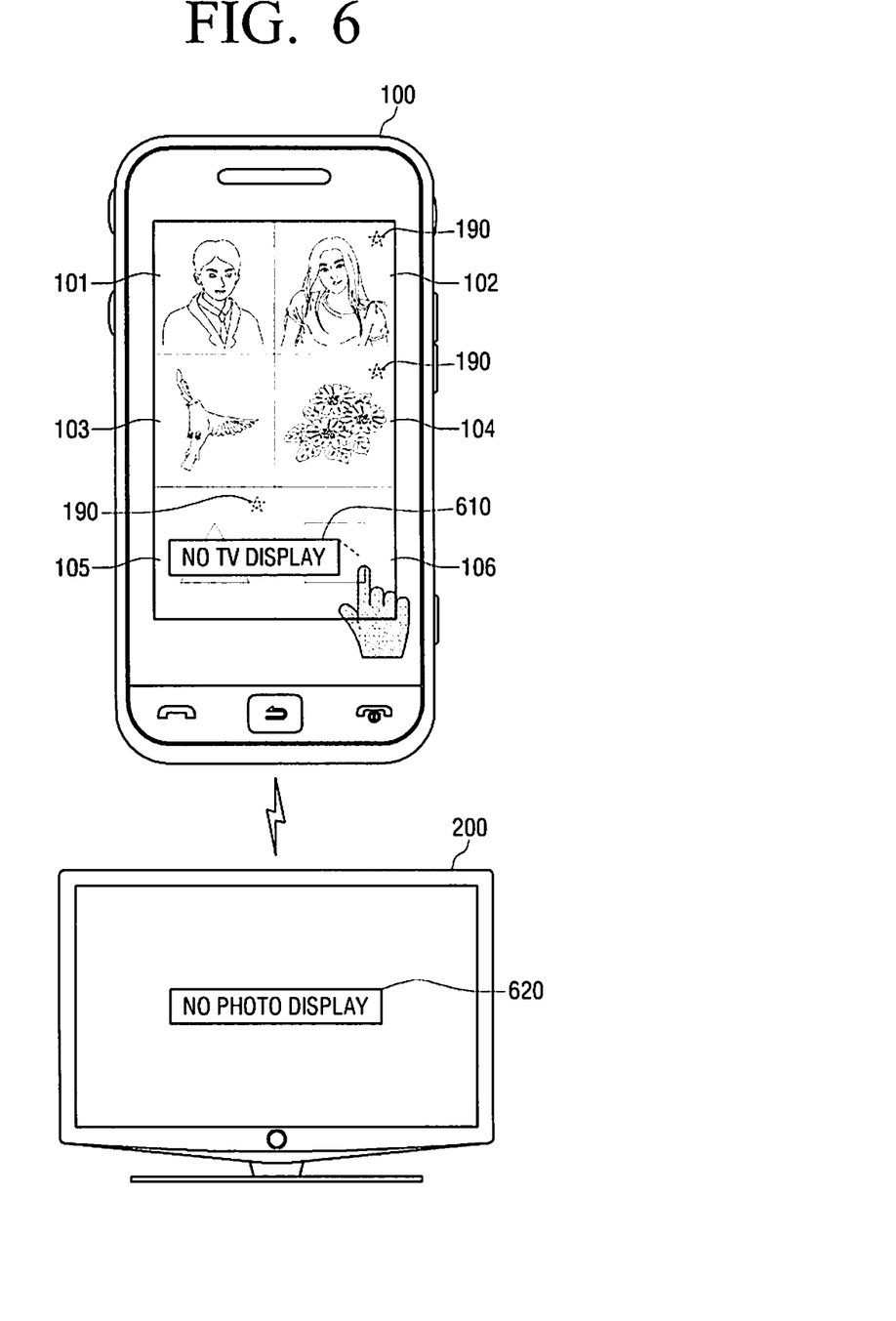
FIG. 6 is a diagram illustrating a TV no display message when a photo without an open tag is to be displayed on the TV, according to an embodiment of the present invention.

In FIG. 6, the display of the photo not open-tagged is attempted in the TV and the TV no display message 610 is displayed.

FIG. 6 depicts the user who inputs the external play command to display the sixth photo 106 on the TV 200. While the user manipulates to display the sixth photo 106 in the screen of the TV 200 in FIG. 6, the sixth photo 106 is not marked with the open tag 190. Thus, the portable phone 100 sends the no transfer message to the TV 200.

The portable phone 100 displays the message 610 indicating that the sixth photo 106 is untransferable to the TV 200, in the screen. The TV 200 receives the no transfer message from the portable phone 100 and displays a message 620 indicating of no photo display on the screen.

When the user attempts to display the photo not open-tagged in the TV 200, the portable phone 100 and the TV 200 display the message indicating no display on the screen.

Figure 7A:
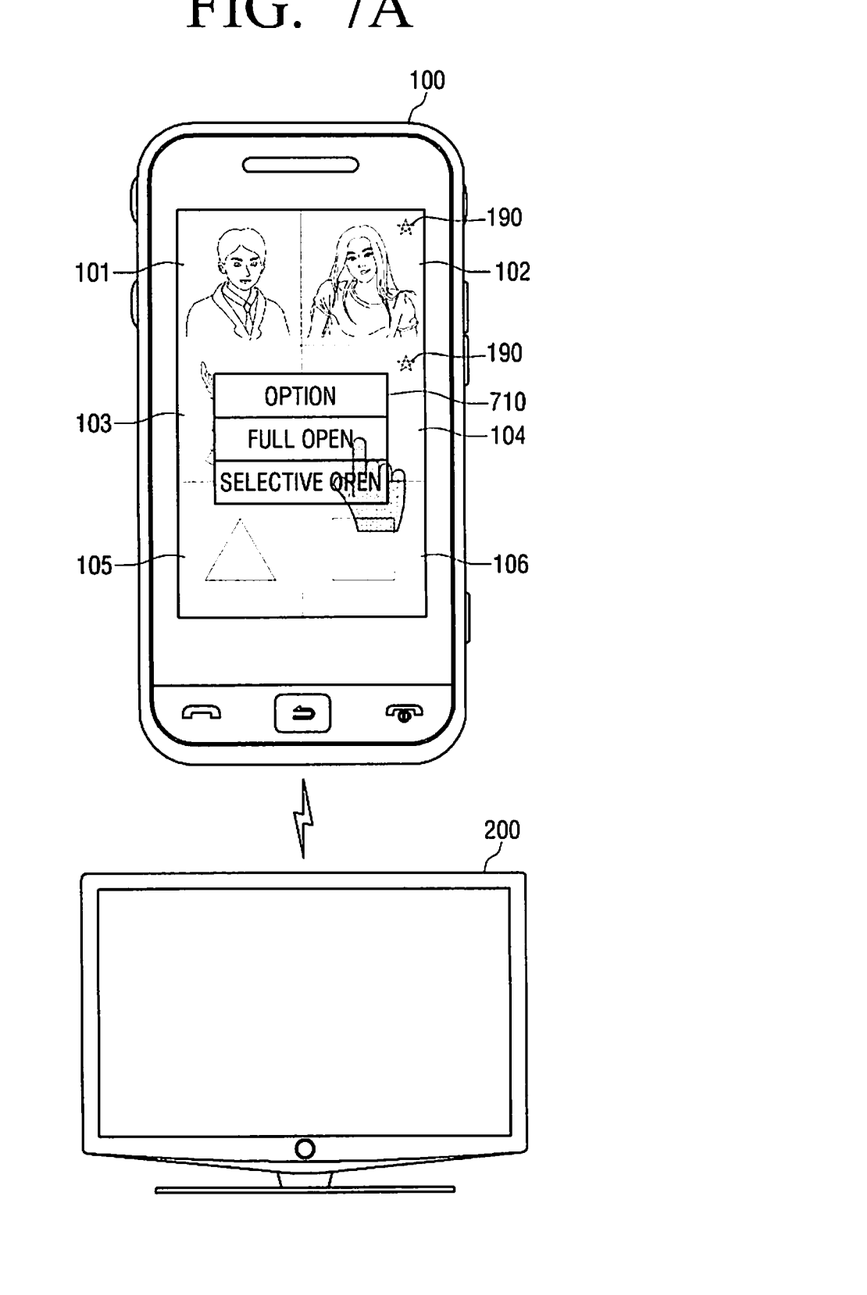
FIGS. 7A and 7B are diagrams illustrating the content providing method when a full open option is selected, according to an embodiment of the present invention.
Figure 7B:
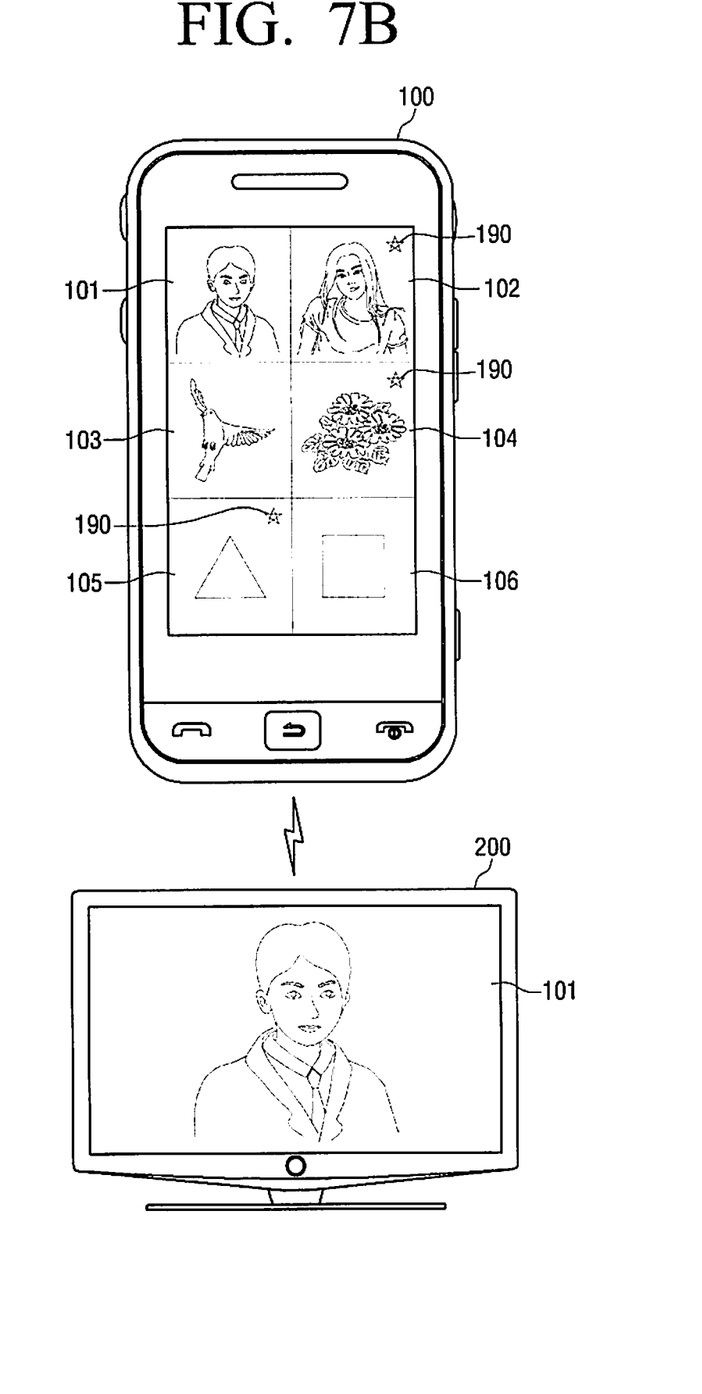

The portable phone 100 may receive the option set command from the user, which is described in detail with reference to FIGS. 7A and 7B. FIGS. 7A and 7B illustrate content provision when the full open option is selected, according to an embodiment of the invention.

FIG. 7A depicts the screen of the portable phone 100 displaying an option setup menu 710. The option setup menu is to set one of the full open option and the selective open option. Using the option setup menu, the user can input the option set command to the portable phone 100.

The full open option transfers every content to the TV 200 regardless of whether the open tag is set. The selective open option transfers only the open-tagged contents to the TV 200.

When the user selects the full open option in the option setup menu as shown in FIG. 7A, the portable phone 100 transfers every content to the TV 200 regardless of the open tag. Accordingly, when the full open option is selected in the portable phone 100, the TV 200 can displays even the photos not open-tagged in the screen.

Hence, when the full open option is selected, the TV 200 may display the first photo 101 not open-tagged in the screen as shown in FIG. 7B.

As such, using the option, the user may set the portable phone 100 to display even the contents not open-tagged on the TV 200.

While the content is a photo in this embodiment of the present invention, other various contents can be applied. More specifically, besides the photo, the content can be a video, music, a document, etc.

The play of the content is construed differently according to the content type. Specifically, when the content is a photo, the play of the content displays the photo in the screen. When the content is a video, the play of the content plays the video on the screen. When the content is music, the play of the content plays the music. When the content is a document, the play of the content displays the document on the screen.

Furthermore, the content can be transmitted in a file or in a streaming.

While the electronic apparatus is the portable phone 100 in this embodiment of the present invention, any apparatus capable of transferring the content externally can be employed. For example, the electronic apparatus can employ a portable phone, a TV, an MP3 player, a PMP, a PDA, a notebook computer, and a computer capable of sending and receiving data.

While the electronic apparatus is the TV 200 in this embodiment of the present invention, any apparatus capable of receiving and playing the content can be employed. For example, besides the TV, the electronic apparatus can employ a portable phone, an MP3 player, a PMP, a PDA, a notebook computer, and a computer capable of sending and receiving data.

According to various embodiments of the present invention, when the play command for the particular content is received from the external apparatus and the particular content is set to the content transferable to the external apparatus, the content providing method transfers the particular content to the external apparatus in reply to the play command. Thus, the user can check only his/her intended photos in the external apparatus.

While the invention has been shown and described with reference to certain embodiments thereof, it will be understood by those skilled in the art that changes in form and detail may be made therein without departing from the spirit and scope of the invention as defined in the appended claims and their equivalents.

What is claimed is:

1. A content providing method of an electronic apparatus communicably connected with an external apparatus, the method comprising the steps of:
   receiving a command for transferring content to the external apparatus;
   checking whether the content includes information indicating that the content is transferable to the external apparatus, the information being set by an open setup menu to set whether to open the content, which is displayed on a screen of the electronic apparatus;
   transferring the content, based on the checked information, to the external apparatus; and
   displaying an option setup menu to set one of a full open option and a selective open option.

2. The content providing method of claim 1, further comprising:
   setting at least one content selected by a user from a plurality of stored contents, to the content transferable to the external apparatus.

3. The content providing method of claim 2, wherein setting the at least one content comprises tagging the content transferable to the external apparatus.

4. The content providing method of claim 1, further comprising:
   sending a no transfer message to the external apparatus in response to the command when the content is set to a content untransferable to the external apparatus.

5. The content providing method of claim 1, further comprising:
   receiving a content list transfer request from the external apparatus; and
   in response to the content list transfer request, sending a list comprising only contents transferable to the external apparatus among a plurality of stored contents, to the external apparatus.

6. The content providing method of claim 1, wherein the content is sent to the external apparatus in response to the command when a first option is selected and the content is set to the content transferable to the external apparatus.

7. The content providing method of claim 6, wherein, when a second option is selected, the content is sent to the external apparatus in response to the command regardless of whether the content is set to the content transferable to the external apparatus.

8. The content providing method of claim 1, wherein the content comprises at least one of image content, video content, music content, and document content.

9. The content providing method of claim 1, wherein the information is included in a header area of the content.

10. The content providing method of claim 1, wherein transferring the content further comprises transferring the content when the selective open option is set and included in the checked information, indicating that the content is transferable to the external apparatus.

11. A content providing method of a content providing system which comprises an electronic apparatus and an external apparatus communicably connected with each other, the method comprising the steps of:
   receiving, at the external apparatus, a command for transferring content;
   sending, at the electronic apparatus, the command for transferring the content from the external apparatus to the electronic apparatus;
   checking, at the electronic apparatus, whether the content includes information indicating that the content is transferable to the external apparatus, the information being set by an open setup menu to set whether to open the content, which is displayed on a screen of the electronic apparatus;
   transferring, at the electronic apparatus, the content, based on the checked information, to the external apparatus; and
   displaying an option setup menu to set one of a full open option and a selective open option.

12. The content providing method of claim 11, further comprising:
   setting, at the electronic apparatus, at least one content selected by a user from a plurality of stored contents, to the content transferable to the external apparatus.

13. The content providing method of claim 12, wherein setting the at least one content comprises tagging the content transferable to the external apparatus.

14. The content providing method of claim 11, further comprising:
   sending a no transfer message from the electronic apparatus to the external apparatus in response to the command, when the content is set to a content untransferable to the external apparatus.

15. The content providing method of claim 11, further comprising:
   receiving, at the external apparatus, a content list display command;
   sending a content list transfer request from the external apparatus to the electronic apparatus; and
   in response to the content list transfer request, sending a list comprising contents transferable to the external apparatus among a plurality of stored contents, from the electronic apparatus to the external apparatus.

16. The content providing method of claim 11, wherein the content is sent to the external apparatus in response to the command when a first option is selected and the content is set to the content transferable to the external apparatus.

17. The content providing method of claim 16, wherein, when a second option is selected, the content is sent to the external apparatus in response to the command regardless of whether the content is set to the content transferable to the external apparatus.

18. The content providing method of claim 11, wherein the content comprises at least one of image content, video content, music content, and document content.

19. The content providing method of claim 11, further comprising:
   receiving, at the electronic apparatus, a command for playing the content in the external apparatus,
   wherein the content is sent to the external apparatus from the electronic apparatus in response to the command when the content is set to the content transferable to the external apparatus.

* * * * *